Figure 1:
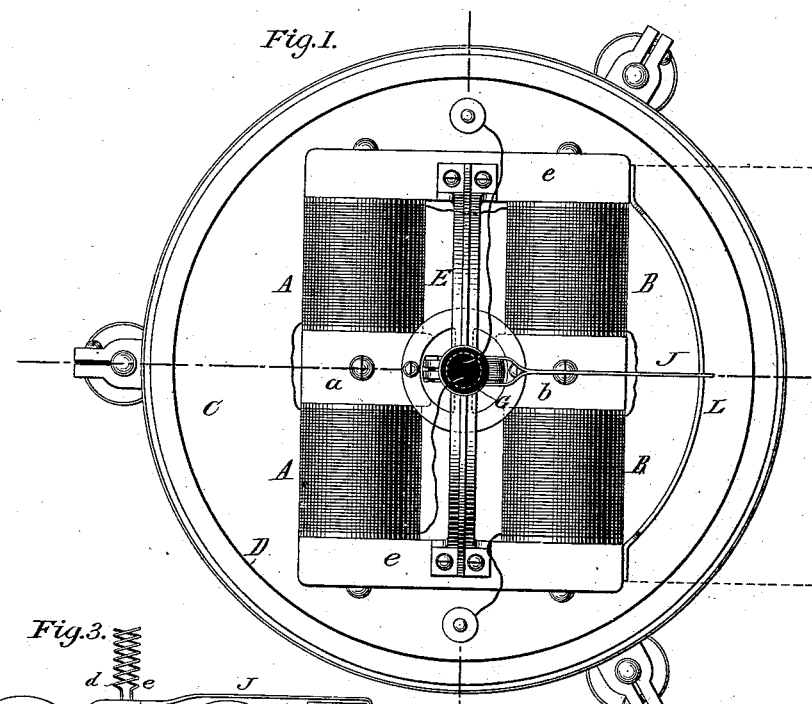

(No Model.) 2 Sheets—Sheet 1.

E. WESTON.
ELECTRICAL INDICATOR.

No. 334,145. Patented Jan. 12, 1886.

Attest:
Raymond F. Barnes
J. Daniel Compton

Inventor:
Edward Weston
By Parker W. Page atty (No Model.) 2 Sheets—Sheet 2.
E. WESTON.
ELECTRICAL INDICATOR.
No. 334,145. Patented Jan. 12, 1886.
Fig. 6.
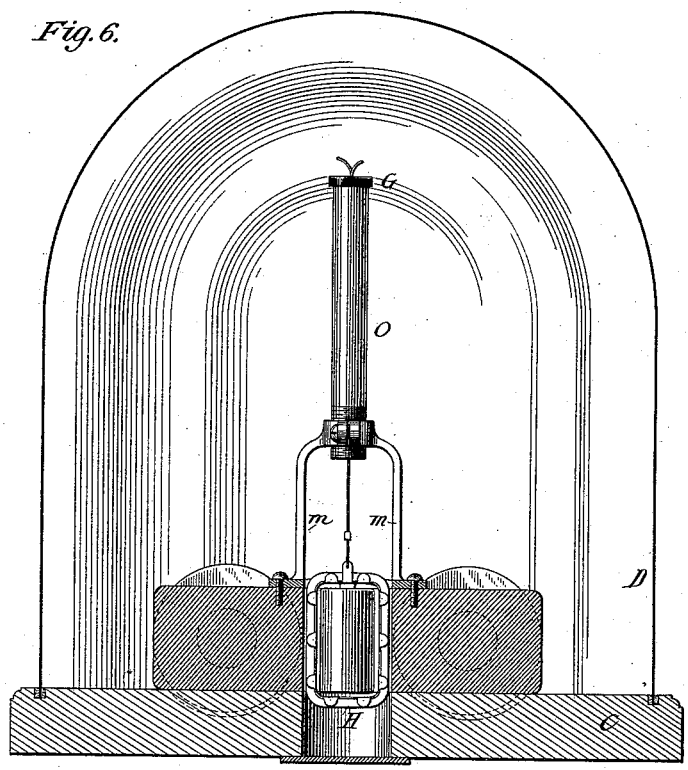
Fig. 8.
Fig. 7.
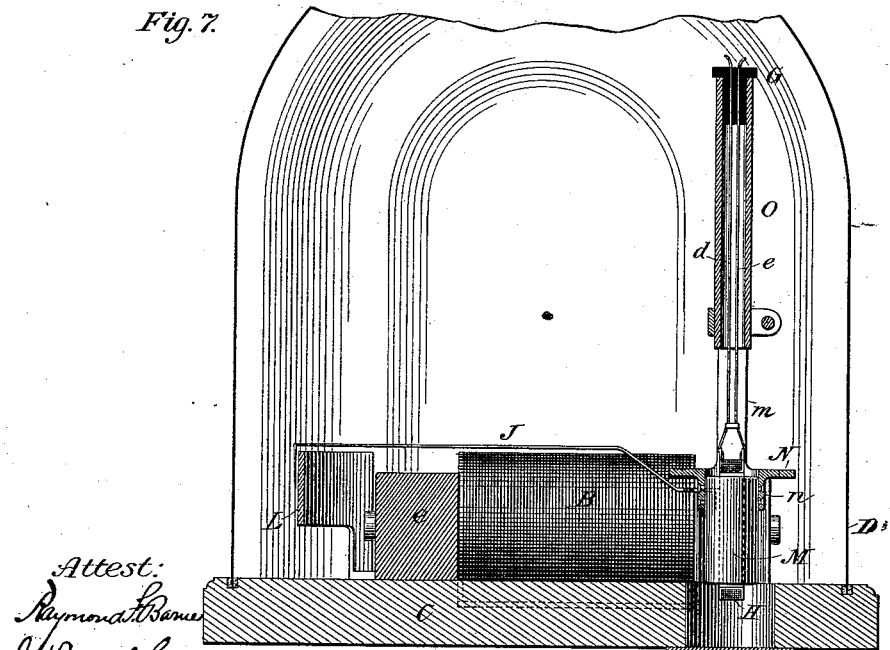
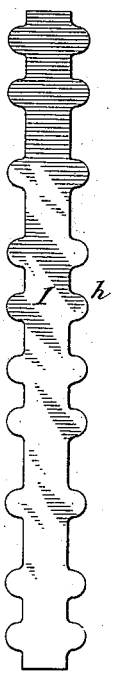
Attest:
Raymond H. Barne
J. Daniel Compton.
Inventor:
Edward Weston
By Parker W. Page
atty.
N. PETERS, Photo-Lithographer, Washington, D. C.

UNITED STATES PATENT OFFICE.

EDWARD WESTON, OF NEWARK, NEW JERSEY, ASSIGNOR TO THE UNITED STATES ELECTRIC LIGHTING COMPANY, OF NEW YORK, N. Y.

ELECTRICAL INDICATOR.

SPECIFICATION forming part of Letters Patent No. 334,145, dated January 12, 1886.

Application filed August 26, 1885. Serial No. 175,349. (No model.)

*To all whom it may concern:*

Be it known that I, EDWARD WESTON, a subject of the Queen of Great Britain, and a resident of Newark, in the county of Essex, and State of New Jersey, have invented certain new and useful Improvements in Electrical Indicators, of which the following is a specification, reference being had to the drawings accompanying and forming a part of the same.

My invention comprises an apparatus for indicating the changes or variations in the electro-motive force in any given circuit, and is what I term a "volt-indicator."

My invention consists both in a novel arrangement and combination of the parts comprising my apparatus, and in certain details of the construction of said parts, which I shall first describe in general terms, and particularize by reference to the drawings hereto annexed and by the claims.

My object is to obtain positive deflections of great amplitude of a needle or pointer over a suitable scale, which shall correspond to variations in the electro-motive force in a given circuit. I therefore use an instrument of the following general character: A coil of wire is supported between the poles of a magnetic system, between which a magnetic field is formed, the lines of force of which are substantially parallel. The normal position of the coil is in a plane parallel to these lines, and the means of support are so constructed as to oppose the rotation of the coil.

In order to add to the strength of the field in which the coil is placed, I support within the coil a core or cylinder of soft iron, so that the magnetic circuit is only broken by the annular space through which the coil moves. The coil may be suspended by any of the ordinary torsional filar supports used in instruments of this kind; but I prefer to employ two conducting-wires twisted in spirals or held parallel to one another, which not only oppose the rotary movement of the coil, but are also used to convey the current through the coil. To the coil is attached a needle or pointer that sweeps over a scale, so that the changes in the position of the coil are indicated to the eye. The coil itself is wound on a non-magnetic frame, which I make in the following manner:

A strip of preferably sheet-copper is punched out with a die, the width of the strip being that intended for the coil. The strip is bent into a ring or square, and its ends secured and the coil then wound upon it. Along its sides are ears, which are turned up to form the sides of the frame that incloses the coil or supports it.

The above constitute the main features of the construction of the apparatus, which I shall now describe more in detail by reference to the drawings.

Figure 4:
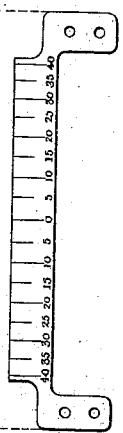
Figure 3:
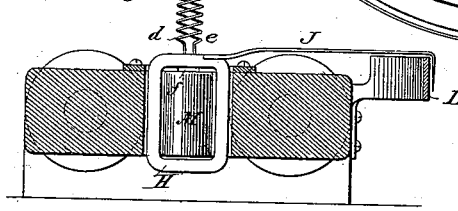
Figure 5:
Figure 2:
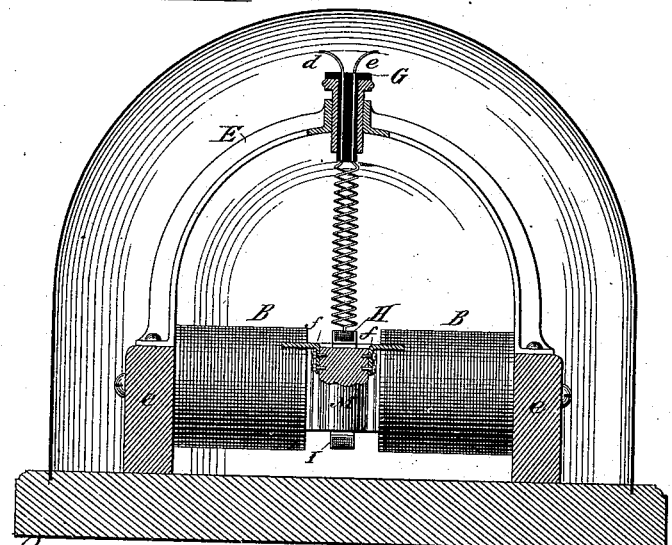

Figure 1 is a top plan view of an apparatus embodying my invention. Fig. 2 is a side elevation of the same. Fig. 3 is a cross-section of the magnets. Fig. 4 is a side elevation of the scale. Fig. 5 is a detail of the coil-support and indicator-needle. Fig. 6 is a view partly in elevation and partly in section of a modified form of my invention. Fig. 7 is a similar view of the apparatus at right angles to that in Fig. 6. Fig. 8 is a detail of the strip for forming the holder for the coil.

In Fig. 1 the magnetic system is composed of two cores, A and B, with pole-pieces $a$ and $b$, the cores being wound to produce consequent poles in the pole-pieces. These are mounted on a leveling-base, C, and the entire apparatus is covered by a bell-jar, D. To the cross-pieces $c$ of the magnets is fixed a bow-support, E, carrying at its center an adjustable plug or screw, F, into which is inserted a plug, G, of insulating material. Through the plug G extend two brass wires, $d$ $e$, that support the coil H. These wires may be twisted in spirals, or maintained parallel and form the terminals of the coil, so that a current passed through them circulates through the coil. The coil H is wound on a non-magnetic frame or flanged ring, I, to which is secured a pointer or needle, $j$, that sweeps over a scale, L. Within the frame and coil is supported a soft-iron core or cylinder, M, by means of the braces $ff$, as in Fig. 2, for instance, which permit the coil to make nearly half the revolution, which is amply sufficient for all ordinary purposes.

In order to cheapen the cost of the device and facilitate its construction, I make the frame as shown in Fig. 8—that is to say, I cut or punch out a flat strip with ears $h$ on its sides, and I bend it around in the desired shape and secure its ends. Either before or after this I bend up the ears $h$ to form the sides of the groove in which the coil is wound.

The instrument illustrated in Figs. 6 and 7 is constructed on a slightly modified plan. It differs from the form described in the following general particulars: One half of the magnetic cores are dispensed with, the form of magnet being that of the horseshoe type. To the poles of this I secure a casting, which is a plate, N, with downwardly-projecting lugs $n$, that support the iron cylinder, M, and two arms, $m\ m$, formed or provided with a clamp that holds a tube, O. In the top of this tube is the insulating-plug G, through which pass the wires $d\ e$, that in this case are parallel and connected to the coil H.

In all cases the magnets are constructed with special reference to producing a uniform or symmetrical field in which the lines of force are substantially parallel and the coils of the magnets are in circuit with the suspended coil H.

In using the instrument it may be connected directly in the main circuit; but it is usually in a branch or derived circuit to the main, so as to be affected by a comparatively small portion of the entire current. Normally the coil H, as has been stated, is in a plane parallel to the lines of magnetic force; but by the passage of a current through it a tendency is imparted to it to assume a position at right angles to the lines of force. This tendency is opposed by the bifilar support, so that it assumes an intermediate position which corresponds to the electro-motive force of the current passing through it. In order to secure these results, the magnet-coils are so constructed or oppose such resistance to the current that they magnetize the field far below the point of saturation with any current with which the instrument is likely to be used. It follows therefore that the intensity of the magnetic field corresponds more or less exactly with the strength of the current, and this is an essential element in the proper working of the apparatus.

It will be observed that in the action or operation of the device the suspended coil, being traversed by a current flowing in a plane parallel to the lines of magnetic force, has a tendency to move across these lines at right angles. In the particular form of device here shown this movement is about the axial center of the coil. The same action or effect is, however, obtained by various other constructions which are not described herein, but made the subject of other applications for patent, as in my application No. 177,433, filed September 18, 1885.

It is evidently essential to the attainment of accurate results that the field of force should be either uniform or symmetrical, so that the directive force of the current in determining the position of the coil shall be the same for all positions of the coil within said field.

This instrument I have called a "volt-indicator" as distinguished from a volt-meter or measure of electro-motive force.

The object in view is to obtain a wide range of movement for a slight change in electro-motive force, and this is accomplished by the device as constructed.

In order that the apparatus may be effective for this purpose, the field is so proportioned or wound that the magnetizing effect of the coils is far below the maximum or that requisite for complete saturation. Under these circumstances or conditions a slight change in the electro-motive force in the circuit produces a nearly corresponding effect upon the magnetism of the field. Not only does this in itself tend to impart a considerable movement to the suspended coil, but this tendency is increased by the reactive effect of the increased current passing in the coil itself.

In practice I prefer to use the form of field shown in Figs. 1 and 2, as I have found that much more accurate and better results are obtained thereby than with any other.

What I claim is—

1. The combination, with the poles of an electro-magnetic system constructed or wound so that the magnetic strength of the same varies with the strength of the current acting upon it, of a coil mounted in a plane parallel with the lines of force and capable of a movement across said lines, means for opposing such movement of the coil, connections for passing a current through the coil, and a pointer and scale for indicating the movements of said coil, all as set forth.

2. The combination, with the poles of an electro-magnetic system constructed or wound so that the magnetic strength of the same varies with the strength of the current acting upon it, of a coil suspended or mounted in a plane parallel with the lines of force and capable of a movement across said lines, a stationary soft-iron core within said coil, means for opposing the movement of the coil, connections for passing a current through it, and a pointer and scale for indicating the movements of the same, all as set forth.

3. The combination, with the poles of a magnetic system, of a coil suspended in a plane parallel with the lines of force and capable of a movement across the same, two wires forming a bifilar torsional support for the coil, and the means by which the current is passed through the coil, and a pointer and scale for indicating the changes of position of the coil, as set forth.

4. The combination, with magnetic poles forming a uniform or symmetrical field, of a coil suspended within said field, so as to be capable of movement across the lines of force, a stationary soft-iron core within said coil, means for passing a current through the coil, and a pointer and scale for indicating its changes of position, as described.

5. The combination, with the poles of a magnetic system, of a supporting arm or frame secured thereto, a coil suspended from said frame in the magnetic field and capable of a given movement across the lines of force, a stationary core within the coil and secured to the poles of the magnets, and a pointer and scale for indicating the changes of position of the coil, substantially as described.

6. The frame or spool for the suspended coil, formed of a flat strip having ears on its sides that are bent up to form the sides of the groove in which the coil is contained, the strip being bent into a ring or other suitable form and its ends secured together, as set forth.

7. The combination, with the poles of a magnetic system, of a coil suspended in the field formed thereby, a bifilar torsional support for said coil composed of two wires secured to an insulating plug or head and forming the conductors by which the current is carried through the coil, an arm or frame supporting said plug, and a pointer and scale for indicating the changes of position of the coil.

EDWARD WESTON.

Witnesses:
HENRY A. BECKMEYER,
GEO. B. PRESCOTT, Jr.